Nov. 15, 1955 F. P. GOHOREL 2,724,019
AUTOMATIC TELEPHONE SYSTEMS
Filed Oct. 8, 1951 2 Sheets-Sheet 1

Inventor
F. P. GOHOREL
By Robert Harding Jr.
Attorney

Nov. 15, 1955 F. P. GOHOREL 2,724,019

AUTOMATIC TELEPHONE SYSTEMS

Filed Oct. 8, 1951 2 Sheets-Sheet 2

Inventor
F. P. GOHOREL
By Robert Harding Jr.
Attorney

United States Patent Office
2,724,019
Patented Nov. 15, 1955

2,724,019

AUTOMATIC TELEPHONE SYSTEMS

Fernand Pierre Gohorel, Antony, Seine, France, assignor to International Standard Electric Corporation, New York, N. Y., a corporation of Delaware Application October 8, 1951, Serial No. 250,318
Claims priority, application France October 13, 1950
8 Claims. (Cl. 179—18)

This invention relates to telephone systems and more particularly to such systems which comprise translator registers. In these systems, the number dialed by the calling subscriber is received in a register and then transmitted either in whole or in part to a translator temporarily associated with said register. The translator analyzes the combination it receives, causes to be sent to the register the various combinations for routing the call and metering it (if necessary), and then releases. It is possible to reduce considerably the time the translators are busied by using arrangements which indicate the routing as soon as the translator receives the indication from the distant exchange. Such arrangements are known in which use is made of relay groups and a "routing relay" for each of the routings to be made.

The object of the invention is to simplify these arrangements and decrease further the time required to translate the indications received.

One of the features of the invention consists in replacing each routing relay with as many rectifiers as may be required by the routing indication.

For example, use may be made of a rectifier for each of the selections to be made, a rectifier to meter the call, etc.

Another feature of the invention consists in applying to the translators the principles set forth in the patent application filed by Martinus den Hertog on June 12, 1950, Serial No. 167,674, for "Signaling and Control System for Electric Circuits and Equipments" and consists particularly in converting each number received from the register into a characteristics potential obtained by a "resistance-rectifier" coincidence system, this potential being made to appear at a given point and at only one point peculiar to said number.

Another feature of the invention consists in transferring the characteristic potential of a number to the starting electrode of gas-filled tubes, so that when these tubes operate in combination they generate potentials that characterize the selections or control operations to be transmitted to the register.

Another feature of the invention is based on the fact that the register transmits directly to the translator the potentials necessary for the operation of the coincidence systems, the translator transmitting directly to the register the potentials necessary for the operation of the relays which control, in said register, the successive selections necessary for routing the call to the distant exchange.

Figure 1:
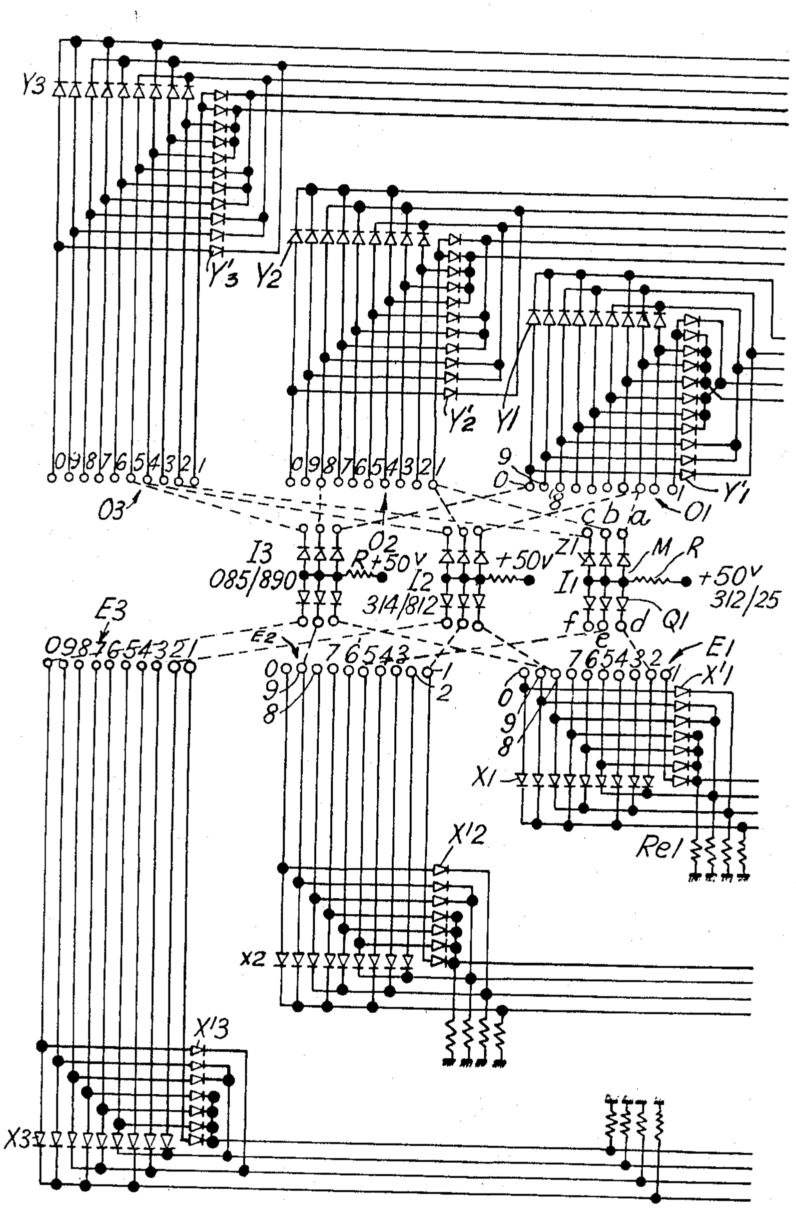
Figure 1A:
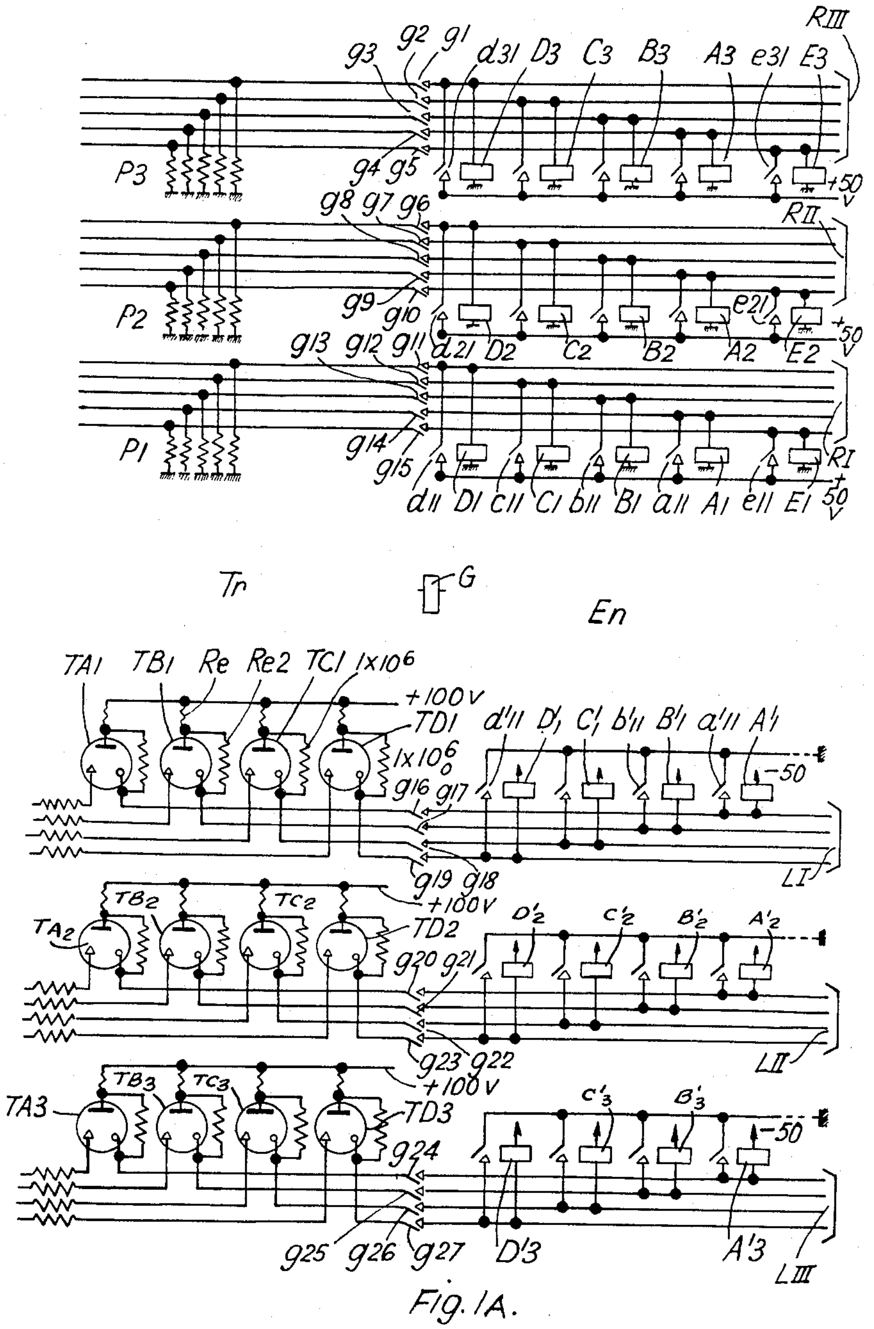

Various other features will become apparent from the following description, given as a non-limitative example, reference being had to the attached drawing, in which:

Figs. 1 and 1A, placed side-by-side, represent a translator according to the invention and comprise rectifiers and gas filled tubes as well as part of a register associated with the translator.

In the following description, the contact springs associated with a given relay are indicated by placing one of the numbers from 1 to 9 after the relay reference (in small letters).

In the example shown it is the first three digits registered that determine, for each of the thousand combinations possible, each of the corresponding routings. The latter are obtained by *n* selections; the indication of these *n* selections is given by means of *n* indicating devices, only three of which are shown.

In the register, each of the first three digits received is registered on a combination of five relays A1, B1, C1, D1, E1—A2, B2, C2, D2, E2—A3, B3, C3, D3, E3, the energizing of which depends on the size of the digit received. The following table, which is given as an example, shows the relationship between each of the digits received and the relays energized:

| Digit Received | Relay Energized | | |
|---|---|---|---|
| | 1st Digit | 2nd Digit | 3rd Digit |
| 1 | A1—E1 | A2—E2 | A3—E3 |
| 2 | B1—E1 | B2—E2 | B3—E3 |
| 3 | C1—E1 | C2—E2 | C3—E3 |
| 4 | D1—E1 | D2—E2 | D3—E3 |
| 5 | A1—B1 | A2—B2 | A3—B3 |
| 6 | A1—C1 | A2—C2 | A3—C3 |
| 7 | A1—D1 | A2—D2 | A3—D3 |
| 8 | B1—C1 | B2—C2 | B3—C3 |
| 9 | B1—D1 | B2—D2 | B3—D3 |
| 0 | C1—D1 | C2—D2 | C3—D3 |

These relays are energized by a battery (not shown), the negative terminal of which is grounded and the positive pole (+50 volts, in the example chosen) is connected to two of the five wires of each group RI, RII, RIII.

Thus, for example, if 312 is dialed, relays C1, E1, A2, E2, B3, E3 operate. Relays C1 and E1 are energized by +50-volt potentials (not shown) applied to the second and fifth wire of the wire group RI. The other relays are energized over similar circuits.

Relay A1 holds at its front contact *a*11 and the wire having a potential of +50 volts. The other registering relays hold over similar circuits.

When register E*n* is associated with translator T*r*, contacts *g*1 to *g*27 are closed by any suitable means. A +50-volt potential then appears on the front contact of *g*12 because of the closing of contact *c*11. In like manner, +50-volt potentials appear on front contacts *g*15, *g*9, *g*10, *g*3 and *g*5.

In translator T*r*, the three groups of contacts *g*1 to *g*5, *g*6 to *g*10 and *g*11 to *g*15 are normally connected to ground through low resistances P1, P2 and P3.

The three groups of contacts *g*1 to *g*5, *g*6 to *g*10 and *g*11 to *g*15 are connected through three groups of rectifiers Y1, Y'1—Y2, Y'2—Y3, Y'3, to three groups, O1 to O3, of 10 terminals each; these rectifiers are connected in such a way that they conduct in the direction of the ground on resistances P1 to P3, except in the case of the terminal for which the two connected wires are both brought to a +50-volt potential. More exactly, if by any suitable means a +50-volt potential is applied to terminal O1 No. 1, current flows through the following circuit: +50-volt potential, terminal O1 and No. 1, the first upper one of rectifiers Y'1, one of resistances P1, and ground. In a similar manner, if a +50-volt potential is applied to terminals O1 Nos. 2, 4, 5, 6, 7, 8, 9 and 0, current flows through rectifiers Y1, Y'1 and resistances P1. On the other hand, if a +50-volt potential is applied to terminal O1 No. 3, no current can flow through the corresponding rectifiers, since the other terminal of said rectifiers is at a potential of +50 volts owing to the fact that front contacts *g*12 and *g*15 are also at this potential, as already explained, because of the operation of relays C1 and E1.

Thus, terminal O1 No. 3 shows by its electrical condition that the first digit registered is 3. Likewise, terminals O2 No. 1 and O3 No. 2 indicate by their electrical condition that the next two digits are 1 and 2, respectively.

In addition, there are reistances R and rectifiers Z1, Q1, each resistance assembly R and rectifier assembly Z1, Q1, corresponding to a number to be translated.

The three terminals *a*, *b*, *c* are connected to the three sets of terminals O1, O2, O3, respectively, depending on the number to be translated. Thus, assembly I1, made up of resistance R and rectifiers Z1 and Q1, corresponds to the number 312. Terminal *a* of said assembly is connected to terminal 3 of the first group of terminals O1. Terminal *b* is connected to terminal O2 No. 1, and terminal *c* is connected to terminal O3 No. 2.

The resistance-rectifier assemblies referenced by the numbers I2 and I3 correspond to the numbers 314 and 085, respectively. They are therefore connected to the three groups of terminals O1, O2 and O3.

When translator T*r* is not in use, point M of the resistance-rectifier assembly is at ground potential. In fact, current flows through the following circuit: +50-volt potential, resistance R, upper rectifier Z1, terminal *a*, terminal O1 No. 3, one of rectifiers Y'1, one of resistances P1, ground, and, in parallel with the preceding circuit, one of rectifiers Y1, one of resistances P1, and ground. Since resistances P1 are very low as compared with resistances R, point M is at practically ground potential. However, because the number 312 was registered, no current can flow in terminal O1 No. 3, terminal O2 No. 1, and terminal O3 No. 2, as will be understood from the foregoing explanation. Under these conditions, point M is brought to a +50-volt potential.

It will be noted that if current can flow through only one or two of the three terminals *a*, *b* or *c*, point M is at ground potential. Such is the case, for example, of point M of group I2; no current can flow through terminal *a* or terminal *b* of said group, since said terminals are connected to terminal O1 No. 3 and terminal O2 No. 1, respectively. It can, however, flow through terminal *c* and terminal O3 No. 4. Thus, when the first three digits received by the register are transferred to translator T*r* by the closing of contacts *g*1 to *g*15, the only point M which is brought to the +50-volt potential is the one forming part of the resistance-rectifier assembly corresponding to the number received.

Point M is connected to as many rectifiers Q1 as there are selections to be made. In the example considered, it will be assumed that three selection operations must be made. Consequently, three rectifiers Q1 have been provided. Said rectifiers are connected to terminals *d*, *e* and *f* of a translation distributor.

On the other side of this distributor there are provided three groups of 10 terminals E1, E2 and E3, which are coupled through rectifiers X1, X'1, X2, X'2, X3, X'3 to three sets of four wires connected to the starting electrode of the three groups of gas filled tubes TA1, TB1, TC1, TD1, TA2 . . . TD2, TA3 . . . TD3. The cathodes of these tubes are connected to three groups of four contacts *g*16, to *g*19, *g*20 to *g*23, *g*24 to *g*27, respectively, and from there to three groups of four relays A'1 . . . D'1, A'2 . . . D'2, A'3 . . . D'3. The upper terminal of these relays is connected to the negative terminal of a 50-volt battery the positive terminal of which is grounded, i. e., at a 50-volt potential, if ground is taken as reference potential. The anodes of the gas filled tubes are given a +100-volt potential through resistances intended to limit the plate currents.

If no digit has been registered in translator T*r*, the tubes do not fire, because the starting electrodes are grounded through point M, rectifiers Q1, terminals E1 to E3, and rectifiers X1, X'1, X2, X'2, X3, X'3; the potential difference between the starting electrode of each of the tubes and the cathode, namely 50 volts in the example described, is not sufficient to fire the tubes. Very high resistances, of the order of 1 megohm, are provided between the anode and the cathode of each of the tubes, on the one hand, and between the starting electrode and ground, on the other, in order to prevent untimely starting in the event of an open circuit.

Each of the terminals *d*, *e* and *f* corresponds to one selection and is connected to that one of the 10 terminals E which corresponds to the characteristic number of said selection. Thus, in the example shown, group I1 must translate 312 into 25, terminal *d* is connected to terminal E1 No. 2, terminal *e* is connected to terminal E2 No. 5, and terminal *f* is isolated. In like manner, resistance-rectifier assembly I2 must translate 314 into 812. Resistance-rectifier assembly I3 must translate 085 into 890, and terminals *d*, *e*, and *f* of said assemblies are therefore wired accordingly.

From a rectifier Q1, terminal *d* and rectifier X1, the potential of point M, i. e., +50 volts, is transferred to the starting electrode of tube TB1. Said tube operates, the potential difference between its starting electrode and its cathode then being 100 volts. The plate current flows through the following circuit: +100-volt potential, resistance R*e*, anode and cathode of tube TB1, front contact *g*17, relay B'1 and −50-volt potential. Relay B'1 is attracted and holds through its front contact *b*'11 and ground.

In like manner, from terminal *e*, one of rectifiers X2, and one of rectifiers X'2, the potential of point M (+50 volts) is transferred to the starting electrode of tubes TA2 and TB2, which operate, thus energizing relays A'2 and B'2 in register E*n*. Thus, the combination 312, translated into 25, is transmitted to the register by relays B'1, A'2 and B'2.

If three selections were necessary, tubes TA3 . . . TD3 and relays A'3 . . . D'3 would have been made to operate.

The following table, which is given by way of example, shows the relationship between each of the digits for making a translated selection and the energized relays.

| Digits translated | Relays Energized | | |
|---|---|---|---|
| | 1st Selection | 2nd Selection | 3rd Selection |
| 1 | A'1 | A'2 | A'3 |
| 2 | B'1 | B'2 | B'3 |
| 3 | C'1 | C'2 | C'3 |
| 4 | D'1 | D'2 | D'3 |
| 5 | A'1—B'1 | A'2—B'2 | A'3—B'3 |
| 6 | A'1—C'1 | A'2—C'2 | A'3—C'3 |
| 7 | A'1—D'1 | A'2—D'2 | A'3—D'3 |
| 8 | B'1—C'1 | B'2—C'2 | B'3—C'3 |
| 9 | B'1—D'1 | B'2—D'2 | B'3—D'3 |
| 0 | C'1—D'1 | C'2—D'2 | C'3—D'3 |

When relays B'1, A'2 and B'2 have been attracted, the register opens contacts *g*1 to *g*27 by any suitable means and the translator releases. The tubes go out, because their cathode circuit is opened. The tubes could also be extinguished by any other suitable means.

Because relays B'1, A'2 and B'2 are energized, ground is applied to the second wire of group L1, the first wire of group L11 and the second wire of group L11. These wires then control the successive selections by means of a selector, by any well-known method.

It is evident that the preceding description has been given only as a non-limitative example, that any number of digits could be registered, that any number of translated digits could be made to correspond to each of the combinations registered, that said translated digits could be used to control selection operations, to meter calls or perform any suitable operations, and that other tables could be drawn up showing the relationship between he digits received or translated and the relays energized, without departing from the scope of the invention.

What is claimed:

1. A translator register comprising a plurality of terminal assemblies, there being one for each number to be translated, each assembly comprising a first terminal, a plurality of second terminals, there being one second terminal for each digit of the translated number, a source of potential, a resistance connected to one terminal of said source, a plurality of rectifiers, there being one for each of said second terminals, said rectifiers being connected between said second terminals and the other end of said resistance and poled so as to permit current to flow from said source in the direction of said second terminals only, means for connecting said other end of said resistance to said first terminal, means for normally connecting the first terminals of all the terminal assemblies to the other terminal of said source, means for altering the potential on the first terminal of the terminal assembly representing the number to be translated so as to approach the potential of the first mentioned terminal of said source, whereby current is prevented from flowing through said resistance connected therewith and the potential of said second terminals connected to that first terminal is raised to approach that of the terminal of said source to which said resistance is connected, a plurality of groups of digit registering devices, there being one group for each digit of the translated number and each group having a registering device for each possible value of said digit, and means connecting the second terminals of each terminal assembly respectively to predetermined ones of the registering devices in the respective groups, each of said registering devices being responsive to a raised potential on the connected second terminal to register a value for the digit, whereby a number determined by the connection of the second terminals to the registering devices is registered.

2. A translator register, as defined in claim 1, in which each terminal assembly comprises a plurality of first terminals, there being one for each digit in the number to be translated, a plurality of additional rectifiers, there being one for each of said first terminals, said rectifiers being connected between said first terminals and the resistance and poled so as to permit current to flow in a direction towards said first terminals, said translator register further comprising a plurality of groups of additional terminals, there being one group for each digit of the number to be translated and each group containing individual terminals representing the possible numbers of a digit, means for normally connecting all of the additional terminals to the other terminal of the source of potential, and means for connecting the first terminals of each terminal assembly, respectively to the individual additional terminals of said groups corresponding to the number represented by said terminal assembly, the means for altering the potential on the first terminal of the terminal assembly representing the number to be translated including means for raising the potential of the particular terminals of each group of additional terminals corresponding to the number to be translated, whereby current is prevented from flowing through said resistance and through said rectifiers connected to said first terminals of the particular terminal assembly so as to raise the potential on the second terminals thereof.

3. A tanslator register, as defined in claim 2, in which the means for normally connecting each additional group of terminals to the other terminal of the source comprises a rectifier network, a lesser number of wires than there are terminals in said group, and a resistance connected between each wire and the other terminal of the source, the rectifier network being connected so as to connect each terminal of the group with one or more of said wires, and the means for raising the potential of a terminal of said group comprises means for connecting one or a combination of said wires to the first terminal of said source.

4. A translator register, as defined in claim 3, in which the means for connecting the wires to the first terminal of the source comprises relay means having contacts for selectively connecting the wires to the first terminal of the source.

5. A translator register, as defined in claim 4, in which the registering devices comprise a plurality of gas discharge tubes having control electrodes, means for connecting the second terminals of said terminal assemblies to particular ones of said control electrodes depending on the translated number, and means for energizing said tubes when the control electrodes thereof are raised in potential by the raise in potential of the second terminals to which they are connected.

6. A translator register, as claimed in claim 5, in which the means connecting the second terminals of the terminal assemblies to the gas tubes further comprises a plurality of groups of additional terminals, there being one group for each digit of the translated number and each group containing sufficient terminals for individually representing the possible numbers in a particular digit, there being a lesser number of gas tubes than there are additional terminals in a group, and a rectifier network between said terminals and said gas tubes and arranged to connect the control electrode of each tube to combinations of said terminals through said rectifiers, whereby an increased potential on one of said additional terminals will cause the energization of one or a combination of said gas tubes for the particular digit, and means connected to said gas tubes for registering which of the particular tubes are energized.

7. A translator register, as defined in claim 1, in which the registering devices comprise a plurality of gas discharge tubes having control electrodes, means for connecting the second terminals of said terminal assemblies to particular ones of said control electrodes depending on the translated number, and means for energizing said tubes when the control electrodes thereof are raised in potential by the raise in potential of the second terminals to which they are connected.

8. A translator register, as defined in claim 7, in which the means connecting the second terminals of the terminal assemblies to the gas tubes further comprises a plurality of groups of additional terminals, there being one group for each digit of the translated number and each group containing sufficient terminals for individually representing the possible numbers in a particular digit, means for connecting each second terminal of each assembly to a particular additional terminal in a different group, there being a lesser number of gas tubes than there are additional terminals in a group, and a rectifier network between said additional terminals and said gas tubes and arranged to connect the control electrode of each tube to combinations of said terminals through said rectifiers, whereby an increased potential on one of said additional terminals will cause the energization of one or a combination of said gas tubes for the particular digit, and means connected to said gas tubes for registering which of the tubes are energized.

References Cited in the file of this patent

UNITED STATES PATENTS

| | | |
|---|---|---|
| 2,244,700 | Horton | June 10, 1941 |
| 2,284,870 | Holden et al. | June 2, 1942 |
| 2,298,699 | Hubbard | Oct. 13, 1942 |
| 2,338,242 | Haigh | Jan. 4, 1944 |
| 2,484,612 | Dehn et al. | Oct. 11, 1949 |
| 2,517,587 | Mohr | Aug. 8, 1950 |
| 2,603,716 | Low | July 15, 1952 |
| 2,633,498 | Schneckloth | Mar. 31, 1953 |